Feb. 23, 1937. H. BURSITZKY 2,071,728
APPARATUS FOR UTILIZING BLOCKS OF CARBON DIOXIDE ICE
Filed July 26, 1935
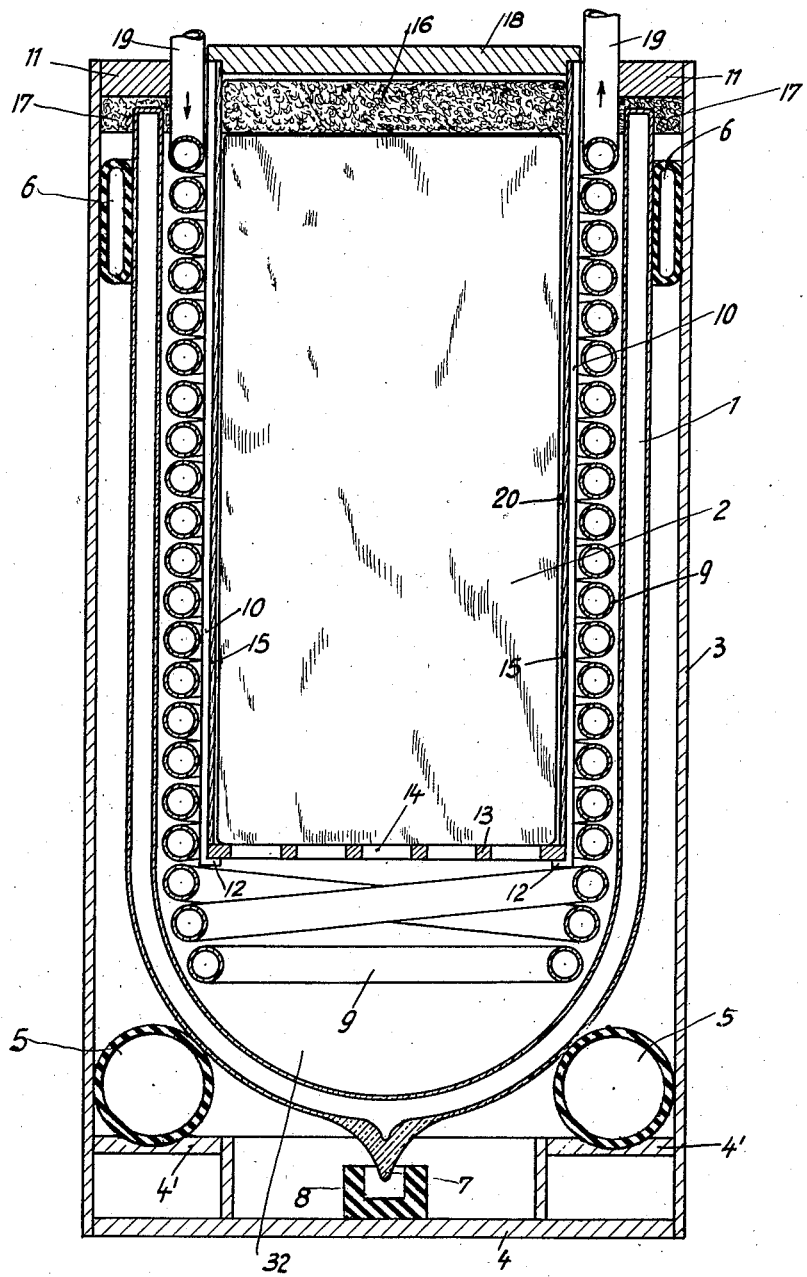
Inventor
Hans Bursitzky
by his Attorney Patented Feb. 23, 1937

2,071,728

UNITED STATES PATENT OFFICE 2,071,728

APPARATUS FOR UTILIZING BLOCKS OF CARBON DIOXIDE ICE

Hans Bursitzky, Strausberg, near Berlin, Germany

Application July 26, 1935, Serial No. 33,329
In Germany July 31, 1934

5 Claims. (Cl. 62—91.5)

My invention relates to improvements in the method of and apparatus for utilizing blocks of carbon dioxide ice ("dry ice") or other solid material as a refrigerant in containers, which are especially designed for storage or transport, and which are particularly adapted to handle the refrigerant without fear of breakage.

To clearly comprehend the purpose of the invention, it is desired to point out that the known containers for a refrigerant include what is generally termed a vacuum vessel composed of spaced glass walls, the air having been exhausted from the space between the walls. These constructions have been found to be entirely unsuitable for use where the contents of the glass vessel consists of solids, e. g. blocks of carbon dioxide ice, because the latter come in contact with the glass walls and may cause the glass to break during the loading operation or while the container is in transit.

With the foregoing in mind it is an object of the present invention to utilize the ordinary glass vacuum vessel in a container comprising an outside protecting shell containing suitable cushioning means to resiliently support the vessel and an inner compartment or container suspended within the vessel and adapted to receive and store the refrigerant or the materials to be chilled or preserved. It is also within the purpose of this invention to introduce between the walls of the vacuum vessel and its inner container a suitable coil tubing, which may be used to carry a flowing cooling medium forming a part of a cooling system or to be incorporated in a cooling unit for milk, beer, water or the like, which may be brought to the proper temperature by the proximity of the refrigerant carried in the container.

I accomplish the purposes of my invention by means of an apparatus one embodiment of which is described in the following specification and illustratively exemplified in the accompanying drawing, in which the view is a substantially longitudinal section of the apparatus by means of which the present invention is put into practice.

Referring to the drawing, I denotes a vacuum vessel consisting of spaced glass walls, the air having been exhausted from the space between the walls. The bottom of the vessel is closed and the top is open to give access to the interior. Suspended within the vacuum vessel I and spaced therefrom along the side and the bottom is an inner compartment or container generally indicated by 20, adapted to contain the refrigerant 2, such as a block of carbon dioxide ice ("dry ice"), or the material to be chilled or preserved. On its exterior the vessel I is protected by an outer shell or box 3, which also is used as a carrier or crate for the vessel and its inner container 20.

In practice the shell 3 is spaced from the outer wall of the vessel I and comprises a continuous upright wall, a bottom plate 4 and a marginal platform 4'. The top of the platform 4' is provided with a plurality of slight depressions to accommodate or form seats for an equal number of inflated balls 5, each of which contacts the wall of the shell 3 and the bottom or closed end of the vacuum vessel I, which thus receives its resilient support at its lower end. I prefer to arrange the balls 5 closely together. A rubber cup 8 mounted centrally of the bottom 4 loosely embraces a projection or point 7 formed in the glass of the outer wall of the vessel I to protect said point. Further cushioning means in the form of a tube 6 is utilized about the upper portion of the vessel, the tube 6 being inflated to the necessary degree and disposed between the vessel and adjacent wall of the shell 3.

The inner compartment 20 comprises preferably a plurality of depending spaced rods 10 of iron or other suitable metal faced on the inside with wood 15. The rods are attached at their upper ends in a wood ring 11 closing the upper end of the shell 3 and at their lower ends are bent or turned inwardly at right angles to form rests 12 upon which the bottom 13 of the container is supported. The bottom 13 is provided with holes or apertures 14 and is preferably made of wood. The seal for the open end of the container 20 is a plug 16 consisting of nettle-cloth tightly filled with wadding or of some other suitable material. The annular space between the compartment 20 and shell 3 beneath the ring 11 is also closed by a ring plug 17 which has a fabric exterior and a tightly packed filler, and which receives and closely embraces the upper end of the glass vessel I. A plate 18 is used to cover the compartment 20. As the perforated bottom 13 is suspended to the ring 11 fastened to the shell 3 the load of an ice block 2 having a weight of 20 to 28 lbs. is taken up by the shell 3 and the ice block does not come in contact with the glass walls of the vessel I, so that a breakage of the latter is avoided.

When the invention is used as a device to cool a flowing liquid or a cooling medium forming a part of a cooling system, a coil 9 is arranged in the space between the inner wall of the glass vacuum vessel I and the inner compartment or container 20. The coil 9 preferably being secured to the rods 10 comprises a continuous tubing having a plurality of coils disposed below the perforated bottom 13 of the compartment 20 and the inlet and outlet ends 19 projected through the ring plug 17 and wood ring 11 to be connected either with a fluid line of a reservoir (not shown) or with a refrigerating machine (also not shown). From said reservoir the liquid to be chilled, i. e. milk, beer or the like, flows through the coil 9 by means of the available head and will be chilled by the ice block 2. If the coil 9 is connected with the refrigerating machine, a gaseous or liquid cooling medium, such as brine, alcohol, diluted glycerine, etc., flows through the coil 9 and is cooled by the ice block 2. This cooling medium is subjected to a mechanical cyclic process by means of a centrifugal pump (not shown) interposed in the conduit and flows through a second coil in the refrigerating machine, where it chills nutritive materials or the like surrounded by said second coil. To control the cooling degree suitable regulating means, such as valves or automatically acting devices, may be installed in the lines carrying the liquid or the cooling medium.

A plurality of cooling devices of the described type may be connected in series and/or in parallel, if desired, and like connections may be provided for the refrigerating machines, if there are several in use.

When the invention is used as a means to chill or preserve stationary articles, such as ice cream or other food products or even a block of carbon dioxide ice or snow, the coil 9 may be removed and a quantity of carbon dioxide ice is placed as a refrigerant outside of the inner compartment 20 on the bottom of the vacuum vessel 1 in the space 32, while the articles to be chilled or preserved are placed on the perforated bottom 13 of the compartment. Thus a perfect safety and security in transportation or storage of food products or blocks of carbon dioxide ice is insured and a breakage of the glass walls of the vessel 1 by said articles is avoided.

I have shown a preferred embodiment of my invention but it is clear that numerous changes and omissions can be made without departing from the spirit.

Having now described my invention and the nature in which the same operates, what I claim and desire to secure by Letters Patent is:

1. A cooling device comprising an outside shell, a double wall vacuum vessel resiliently nested in said shell, and an inner compartment for said vessel comprising a ring arranged over the vessel and attached to said shell, depending rods carried by the ring and disposed inside the vessel, and a perforated bottom member supported on the inner ends of the rods.

2. A cooling device, as claimed in claim 1, in which the said inner ends of the rods are bent inwardly at right angles and the said bottom rests loosely upon said ends.

3. A cooling device comprising an outside shell, a double wall vacuum vessel mounted in said shell, a series of inflated balls arranged on the bottom of said shell to support said vessel and an inflated tube arranged between the upper part of the vessel and shell to hold and protect said vessel, and an inner compartment for said vessel.

4. A cooling device comprising an inner compartment, an outside shell, a vacuum vessel resiliently nested between the walls of the compartment and shell, and a cooling coil disposed between the wall of the compartment and the inner wall of said vessel.

5. A cooling device comprising an outside shell, a double wall vacuum vessel resiliently nested in said shell, an inner compartment for said vessel comprising a ring arranged over the vessel and attached to said shell, depending rods carried by the ring and disposed inside the vessel and a perforated bottom member supported on the inner ends of the rods, and a cooling coil disposed between the wall of the compartment and the inner wall of said vessel and mounted on the outside of said rods.

HANS BURSITZKY.